United States Patent
Scholfield

(10) Patent No.: US 9,253,966 B2
(45) Date of Patent: Feb. 9, 2016

(54) FISHING LURE

(71) Applicant: Max Scholfield, Durango, CO (US)

(72) Inventor: Max Scholfield, Durango, CO (US)

( * ) Notice: Subject to any disclaimer, the term of this patent is extended or adjusted under 35 U.S.C. 154(b) by 265 days.

(21) Appl. No.: 13/936,571

(22) Filed: Jul. 8, 2013

(65) Prior Publication Data
US 2014/0259867 A1    Sep. 18, 2014

Related U.S. Application Data

(63) Continuation-in-part of application No. 13/845,256, filed on Mar. 18, 2013.

(51) Int. Cl.
| | |
|---|---|
| *A01K 85/00* | (2006.01) |
| *A01K 85/01* | (2006.01) |
| *A01K 85/02* | (2006.01) |
| *A01K 83/06* | (2006.01) |

(52) U.S. Cl.
CPC ............ *A01K 85/01* (2013.01); *A01K 83/06* (2013.01); *A01K 85/00* (2013.01); *A01K 85/02* (2013.01)

(58) Field of Classification Search
CPC ....... A01K 85/00; A01K 85/01; A01K 85/02; A01K 83/06
USPC ............ 43/42.39, 42.24, 42.26, 42.28, 42.29, 43/42.37, 42.09, 42.06, 44.2, 44.8, 42.32, 43/44.81
See application file for complete search history.

(56) References Cited

U.S. PATENT DOCUMENTS

| | | | | | |
|---|---|---|---|---|---|
| 1,265,900 | A | * | 5/1918 | Foss | .............................. 43/42.29 |
| 1,976,695 | A | * | 10/1934 | Boehm | ........................ 43/42.26 |
| 1,986,991 | A | * | 1/1935 | Wilson | ................... A01K 85/16 43/42.39 |
| 2,089,605 | A | * | 8/1937 | Hardy | .................... A01K 85/16 43/42.26 |
| 2,235,905 | A | * | 3/1941 | Sherwood | ..................... 43/42.29 |
| 2,492,064 | A | * | 12/1949 | Rauh | ............................ 43/42.28 |
| 2,492,557 | A | * | 12/1949 | Deimler | ........................ 43/44.8 |
| 2,516,399 | A | * | 7/1950 | Lovelace | ..................... 43/42.29 |
| 2,754,613 | A | * | 7/1956 | Rogers et al. | ................ 43/42.28 |
| 2,782,550 | A | * | 2/1957 | Breti | ............................. 43/44.4 |
| 2,795,885 | A | * | 6/1957 | Imberti | ......................... 43/44.4 |
| 2,922,247 | A | * | 1/1960 | Buss | ............................. 43/44.8 |
| 2,952,092 | A | * | 9/1960 | Swenson | ..................... 43/42.06 |
| 2,979,850 | A | * | 4/1961 | Lund | ............................ 43/42.24 |
| 2,992,507 | A | * | 7/1961 | Gray | ............................ 43/42.09 |
| 3,017,716 | A | * | 1/1962 | Hawks | ................... A01K 85/00 43/42.39 |
| 3,034,250 | A | * | 5/1962 | Laba | ............................. 43/44.8 |
| 3,047,975 | A | * | 8/1962 | Pretorius | .............. A01K 97/045 43/42.06 |

(Continued)

FOREIGN PATENT DOCUMENTS

| | | | | | |
|---|---|---|---|---|---|
| FR | 2790361 | A1 | * | 9/2000 | ............. A01K 83/06 |
| GB | 2350043 | A | * | 11/2000 | ............. A01K 83/06 |

(Continued)

*Primary Examiner* — Darren W Ark
(74) *Attorney, Agent, or Firm* — Richard A. Fagin

(57) ABSTRACT

An improved fishing jig for connecting a lure body to a fishing line is disclosed. A rivet is insertable into the lure body and can function as a conduit to the fishing line. The rivet can be connected to a jig weight and can be formed with a single twisted wire forming an eye for engaging a hook barb. A lure attachment can be connected to the rivet, or between the rivet and lure body, to modify the shape, movement, or sensory attributes of the fishing jig. The rivet permits attachment of the line and of jig weights and hooks at selected locations along the length of a soft lure body, significantly extending the operating life of the jig body and by changing the functional operation of the jig when cast into, resting in, or retrieved through the water.

5 Claims, 4 Drawing Sheets

(56) References Cited

U.S. PATENT DOCUMENTS

| | | | | |
|---|---|---|---|---|
| 3,284,945 | A * | 11/1966 | Kurtis | A01K 83/06 43/44.2 |
| 3,349,513 | A * | 10/1967 | Jeff | 43/42.24 |
| 3,359,674 | A * | 12/1967 | Strumor | 43/42.06 |
| 3,377,734 | A * | 4/1968 | Snow | A01K 85/16 43/42.39 |
| 3,465,466 | A * | 9/1969 | Showalter | 43/44.8 |
| 3,693,279 | A * | 9/1972 | Mackie | 43/42.06 |
| 3,803,747 | A * | 4/1974 | Cartwright | A01K 85/00 43/44.81 |
| 3,863,383 | A * | 2/1975 | Lore | 43/44.8 |
| 3,905,149 | A * | 9/1975 | McCloud | A01K 83/06 43/44.8 |
| 3,940,869 | A * | 3/1976 | Roberts | 43/42.24 |
| 3,947,989 | A * | 4/1976 | Bart | 43/42.09 |
| 3,964,203 | A * | 6/1976 | Williams, Jr. | 43/42.29 |
| 3,965,606 | A * | 6/1976 | Bingler | 43/42.39 |
| 3,990,171 | A * | 11/1976 | Davis | 43/42.28 |
| 4,312,148 | A * | 1/1982 | Hardwicke, III | 43/42.26 |
| 4,316,343 | A * | 2/1982 | Creme | 43/42.28 |
| 4,470,217 | A * | 9/1984 | Adams | A01K 83/00 43/44.8 |
| 4,619,069 | A * | 10/1986 | Strickland | 43/42.26 |
| 4,653,212 | A * | 3/1987 | Pixton | A01K 85/00 43/42.39 |
| 4,712,325 | A * | 12/1987 | Smith | 43/42.24 |
| 4,858,367 | A * | 8/1989 | Rabideau | A01K 85/00 43/42.39 |
| 5,027,543 | A * | 7/1991 | Peterson | A01K 85/08 43/42.28 |
| 5,134,801 | A * | 8/1992 | Davey | 43/42.28 |
| 5,228,230 | A * | 7/1993 | Vaught | 43/42.26 |
| 5,230,178 | A * | 7/1993 | Dillard | A01K 83/06 43/44.8 |
| 5,231,786 | A * | 8/1993 | Hughes | 43/42.39 |
| 5,335,443 | A * | 8/1994 | Grigsby, Jr. | 43/44.81 |
| 5,367,817 | A * | 11/1994 | Clark | A01K 85/00 43/42.39 |
| 5,524,377 | A * | 6/1996 | Freeman et al. | 43/42.06 |
| 5,537,775 | A * | 7/1996 | Crumrine | 43/42.39 |
| 5,673,508 | A * | 10/1997 | Snyder | A01K 85/00 43/42.37 |
| 5,709,047 | A * | 1/1998 | Link | 43/42.28 |
| 5,822,913 | A * | 10/1998 | Lau | 43/42.28 |
| 5,890,317 | A * | 4/1999 | Hollomon | A01K 85/00 43/42.37 |
| 5,894,692 | A * | 4/1999 | Firmin | 43/42.28 |
| 6,199,312 | B1 * | 3/2001 | Link | 43/42.28 |
| 6,233,863 | B1 * | 5/2001 | Dotson | 43/42.09 |
| 6,601,336 | B1 * | 8/2003 | Link | 43/42.13 |
| 6,775,944 | B1 * | 8/2004 | Jones, Jr. | 43/42.28 |
| 6,895,711 | B1 * | 5/2005 | Nakamichi | 43/42.24 |
| 6,898,894 | B1 * | 5/2005 | Anderson | 43/42.39 |
| 7,076,911 | B2 * | 7/2006 | Thorne | 43/42.26 |
| 7,114,285 | B1 * | 10/2006 | Ince | 43/42.26 |
| 7,140,146 | B2 * | 11/2006 | Gill | 43/42.39 |
| 7,360,335 | B2 * | 4/2008 | Edwards | 43/42.28 |
| 7,481,018 | B1 * | 1/2009 | Adams | 43/44.8 |
| 7,581,347 | B2 * | 9/2009 | Gill | 43/42.53 |
| 7,658,032 | B2 * | 2/2010 | Avery | 43/42.28 |
| 7,694,453 | B1 * | 4/2010 | Arrico | 43/42.39 |
| 7,730,661 | B2 * | 6/2010 | Gaffney | 43/44.8 |
| 7,748,157 | B1 * | 7/2010 | Hellmann | 43/42.39 |
| 7,788,844 | B1 * | 9/2010 | Ruzicka | 43/57.1 |
| 7,971,387 | B2 * | 7/2011 | Huddleston | 43/44.8 |
| 7,980,021 | B2 * | 7/2011 | Siatkowski | 43/44.8 |
| 8,087,200 | B1 * | 1/2012 | Ferriss | 43/42.39 |
| 8,458,950 | B2 * | 6/2013 | Mayer | 43/42.28 |
| 8,484,884 | B2 * | 7/2013 | Zuk | 43/42.09 |
| 8,544,204 | B2 * | 10/2013 | Davis | 43/42.26 |
| 8,813,418 | B2 * | 8/2014 | Sundstrom | 43/42.06 |
| 8,938,907 | B2 * | 1/2015 | Meade | 43/42.37 |
| 2005/0039374 | A1 * | 2/2005 | Reed | 43/42.39 |
| 2006/0162232 | A1 * | 7/2006 | Allen | 43/42.36 |
| 2007/0144055 | A1 * | 6/2007 | Warczok et al. | 43/42.24 |
| 2007/0175084 | A1 * | 8/2007 | Moffitt | 43/42.24 |
| 2008/0216384 | A1 * | 9/2008 | Hockmeyer | 43/42.37 |
| 2008/0271359 | A1 * | 11/2008 | Moffitt | 43/42.25 |
| 2011/0283595 | A1 * | 11/2011 | Moffitt | 43/42.32 |
| 2012/0174468 | A1 * | 7/2012 | Nakamichi | A01K 85/02 43/44.81 |
| 2012/0216443 | A1 * | 8/2012 | Merritt | 43/44.81 |
| 2014/0013647 | A1 * | 1/2014 | Burke | A01K 83/06 43/44.8 |
| 2014/0059916 | A1 * | 3/2014 | Culver et al. | 43/42.02 |

FOREIGN PATENT DOCUMENTS

| | | | | | |
|---|---|---|---|---|---|
| GB | 2378113 | A * | 2/2003 | | A01K 83/06 |
| GB | 2410880 | A * | 8/2005 | | A01K 83/06 |
| JP | 11151054 | A * | 6/1999 | | A01K 83/06 |
| JP | 11225621 | A * | 8/1999 | | A01K 83/06 |
| JP | 2000083542 | A * | 3/2000 | | A01K 95/00 |
| JP | 2001045918 | A * | 2/2001 | | A01K 83/06 |
| JP | 2004201551 | A * | 7/2004 | | |
| JP | 2006081401 | A * | 3/2006 | | A01K 83/06 |
| JP | 2006115747 | A * | 5/2006 | | A01K 85/00 |
| JP | 2006-325468 | A1 | 12/2006 | | |
| JP | 2006325468 | A * | 12/2006 | | A01K 85/00 |
| JP | 2007129999 | A * | 5/2007 | | A01K 95/00 |
| JP | 2010263881 | A * | 11/2010 | | A01K 85/00 |
| WO | WO 9807312 | A1 * | 2/1998 | | A01K 83/06 |

* cited by examiner

FISHING LURE

This is a continuation-in-part of U.S. patent application Ser. No. 13/845,256 filed Mar. 18, 2013.

BACKGROUND OF THE INVENTION

The present disclosure relates to the field of fishing jigs and lures. More particularly, the invention relates to an improved attachment system for connecting a fishing line to lures such as soft body fishing lures.

Fishing activity ranges from subsistence gathering, to commercial industry, to recreational activity, and to professional competition. Artificial bait lures and attachments have been developed to attract and catch fish, and numerous lures and attachments have been adapted to mimic the appearance and movement of common fish prey.

Fishing jigs are especially prized for catching larger fish because the riggings mimic a large, slow moving meal. There are virtually unlimited techniques for fishing with jigs and jig riggings for different fish species. Jigs are especially effective as a drop bait when the jig has highest visibility and appearance as an easy meal. While swimming jigs such as spinners and those with grass skirts are kept high in the water column, other jigs are designed for resting on the water bottom while keeping an artificial body suspended slightly above the bottom.

Numerous jig designs have been developed for different rigging and fishing applications, and for different fish species. Jig heads can be shaped in many configurations and colors with the most common comprising a round or ball shaped head. Other popular jig head shapes known as flipping jig heads, football jig heads, and grass jig heads are typically moulded to a hook and are sized in different weights ranging from $1/80^{th}$ of an ounce to nearly one pound for large saltwater bottomfish. Other jig head styles are known as wobblers, darter style, slider style, tube style, spinner, and standup styles. Noisemaking attachments, weed guards, and other features are sometimes added to attract fish or to minimize snagging of the hook on underwater obstructions. While certain jig designs such as disclosed in U.S. Pat. No. 7,748,157 to Hellmann (2010) are shaped to encourage movement of the jig, undesirable movement can invert the jig so that it is facing in the wrong direction. As shown in U.S. Pat. No. 5,231,786 to Hughes (1992) a hook eye is commonly positioned in the front of a jig and the weight of the jig body is located to provide a righting moment to the jig.

A bare moving jig is not appetizing to fish, especially in clear, calm water. Accordingly, fish bait bodies are attached to a jig weight and hook to mimic natural bait and to entice a fish strike. Various jig attachments include skirts, feather or hair attachments such as "bucktail jigs". Flexible bait bodies are manufactured from rubber, plastic or silicone and can resemble grubs, worms, frogs, fish, crayfish, paddle tails, lizards, or insects. The flexible bait body is skewered with the jig hook to attach the body to the jig and is subsequently cast into the water.

Because the weighted head of a jig is typically located toward the front, leading end, the body does not uniformly settle in the water when cast because the weighted head settles first in the water column. Locating the weighted head at the front of the plastic bait reduces the natural appearance of certain bait bodies shaped as crayfish or frogs. Efforts to locate conventional jig heads at other locations within a body weaken the integrity of the soft body and reduce the endurance of the lure.

Another problem with conventional jigs is that when soft, flexible bodies are inserted over the hook the structural integrity of the soft body is weakened, increasing the possibility that the soft body will separate from the jig or otherwise become damaged during casting or retrieval or while fighting fish after hookup. One example of this is shown in U.S. Pat. No. 3,965,606 to Bingler (1976), which further incorporated a ball chain swivel to limit twisting movement of the fishing line and connected jig body. Additionally, jig fisherman are frustrated as the soft bait body moves relative to the jig hook, either by bunching up at the wrong place or by sliding backwards on the hook. For swimming jigs with a soft plastic trailer, the preferred bait presentation is that the single tail of a bait body such as a grub should always face downward, perfectly centered and straight in line with the hook without rigging a kink or bend in the flexible bait body. Any movement between the soft bait body and the jig changes the desired movement and performance of the jig assembly in the water.

A variety of techniques have been developed to hold the soft body in a fixed position relative to the jig weight and hook shaft. Unites States Patent Application Publication No. 2009071057 by Hoyt (2009) shows a retainer and hook for preventing a body from moving relative to a hook shaft. Spring locks, corkscrews, hook bends, and multifaceted concentric rings have been used, however most of these structures also reduce the internal strength of the soft, flexible bait body with the undesirable consequences previously described. U.S. Pat. No. 7,140,146 to Gill (2006) shows a bait keeper for retaining the jig body and also contemplates using an internally reinforced artificial bait body to reduce tearing and other damage to such body.

Other techniques have been developed to facilitate the interchange of jig heads with various hook configurations. U.S. Pat. No. 6,898,894 to Anderson (2005) shows an interchangeable jig head and hook uniquely adapted to the jig head. U.S. Pat. No. 5,537,775 to Crumrine (1996) shows a fishhook with an elongated shank adaptable to a weighted jig head so that the hook can be locked to the jig head.

Various techniques have been developed to disguise the shape and scent of artificial fishing lures, and to create a combined shape to emulate the shape of natural baits, or to impart a different motion to the artificial fishing lure as such lure moves through water. U.S. Pat. No. 4,712,325 to Grant (1987) disclosed a lure body having a plurality of thin, elongate chamois strips attached rearwardly of the lure body head to absorb fish scent attractants and to impart a lifelike movement to the lure. U.S. Pat. No. 6,079,146 to Grant (2000) disclosed an adhesive tape for attachment to a lure body wherein the adhesive tape included an open foam cell for retaining a fishing scent enhancement.

A need exists for an improved attachment system for connecting a fishing line to a body and fish hook, and for attaching peripheral lure components to enhance the shape, movement and sensory perception of the fishing lure. The system should be rugged and field adaptable to facilitating the interchange of different jig components, it should allow for the user to decide where the weight and line hook-up should be applied, and should be an improved system for attaching various bait lures to a fishing line.

SUMMARY OF THE INVENTION

The invention provides a fishing jig for connecting a lure body to a fishing line. A rivet having first and second ends is insertable into the lure body at a user selected location for attaching the fishing line to the lure body. A lure attachment is engagable with the rivet, and a retainer such as a hook secures the rivet to the lure body and to the fishing line.

DESCRIPTION OF THE PREFERRED EMBODIMENTS

Figure 1:
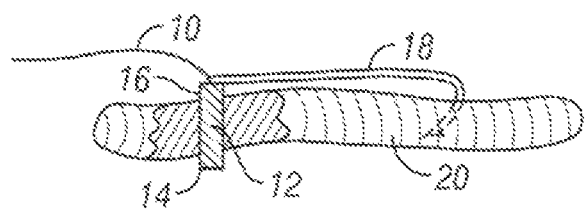
FIG. 1 illustrates a sectional view of a rivet connecting a fishing line and soft lure body.
Figure 2:
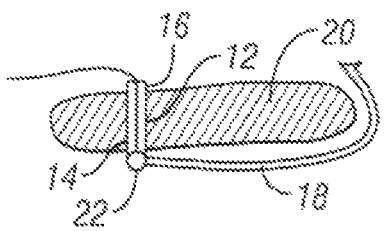
FIG. 2 illustrates a sectional view of a hook detachable connected to one end of a rivet.

The invention provides a unique fishing jig for connecting a lure body to a fishing line. As shown in FIG. 1, fishing line 10 is attached to rivet 12 having first end 14 and second end 16. Rivet second end 16 is connected to hook 18, and rivet first end 14 is shown as being inserted through lure body 20. The point of hook 18 can be free or can be slightly pierced through the surface of body 20 to help retain body from moving relative to rivet 12, or from snagging hook 18 on an underwater obstruction. Lure first end 14 can have eye 22 as shown in FIG. 2 for permitting connection of fishing line 10 around or through body 20, Eye 22 can extend through body 20, can be configured with foldable flaps, or can be connected with another type of structure to restrain body 20 relative to first end 14 and second end 16 of rivet 12. As shown in FIG. 2, hook 18 can be detachably connected to first end 14 of rivet to provide the function of restraining body 20 from movement relative to rivet 12 and line 10.

The term "rivet" 12 as used herein is defined to incorporate numerous configurations and shapes sufficient to engage body 20 and to facilitate in attaching body 20 to line 10. The term "rivet" can be shaped or configured as a grommet, eyelet, snap ring, clevis pin, fastener commonly known as a "split pin" having one or more flexible legs, button, captive fastener, clip, pin, peg, clasp, or staple having one or more shafts for piercing body 20. Rivet 12 can be solid or hollow, and can be regularly or irregularly shaped. In a preferred embodiment of the invention, rivet 12 can be shaped as a full tubular rivet for facilitating insertion of rivet 12 into the soft surface of body 20. Rivet 12 can have one portion in contact with body 20 to facilitate rotational movement of body 20 relative to rivet 12, or can have two or more points of contact to prevent rotational movement of body 20 relative to rivet 12. Rivet 12 can be formed or manufactured from many different materials including metals, plastics or other combinations of materials. Rivet first end 14 or second end 16 can comprise a simple extension of rivet 12 or have a head shaped as an oval, flat, round, brazier, pan, countersunk, hook, eye, or other type of configuration or shape. The attachment of rivet 12 to body 20 can be temporary, releasable, or permanent.

By incorporating rivet 12 as a structural element connecting line 10 and body 20, numerous advantages over prior art connects are obtained. Rivet 12 is easily pushed by a user's fingers through the relatively soft and flexible material typically used to form or construct lure body 20 such as an artificial bait. Instead of tearing or piercing a rough opening or hole through body 20 as is typically done with the insertion of a conventional hook, line or leader, the exterior surface of rivet 12 can be smooth, rounded or lubricated with a lotion or liquid (not shown) to smoothly penetrate body 20 and to reduce the impact of notch sensitivity as body 20 is penetrated. The engagement between rivet 12 and body 20 fixes the location connection of body 20 relative to rivet 12 and eliminates relative movement therebetween. Such engagement also reduces the tendency of soft lure body 20 to tear at the point of connection, thereby extending the useful life of soft body 20.

The combination of line 10, rivet 12 and body 20 create a retainer function which secures rivet 12 at a selected location and orientation relative to body 20. Such retention function can be accomplished in a variety of ways including having line 10 tied to rivet 12 on both sides of body 20, by shaping first end 14 or second end 16 in a fixed or flexible manner to restrict post insertion movement of rivet 12 relative to body 20, by connecting a hook 18 to first end 14, or by connecting another clip or pin to prevent first end 14 from further transverse movement relative to body 20. Spinners, skirts, hair, and trailer hooks can be further attached to line 10, body 20, rivet 12, or to an attached hook to further disguise or to change the functional movement of the assembly in the water.

Figure 3:
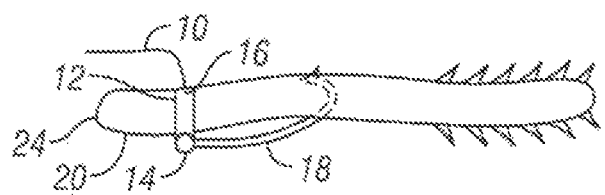
FIG. 3 illustrates a rivet located near the leading end of a lure body.
Figure 4:
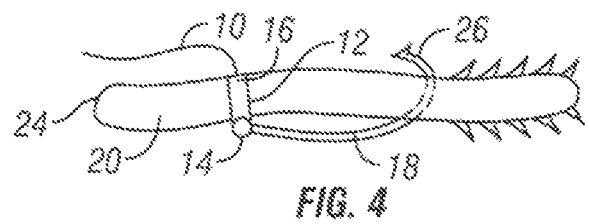
FIG. 4 illustrates a rivet located further away from the lure body leading end.
Figure 5:
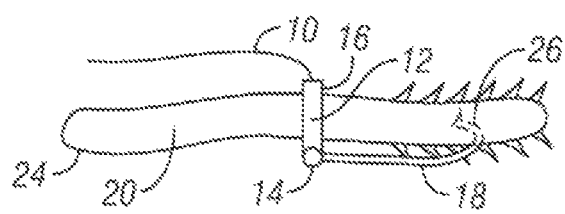
FIG. 5 illustrates a rivet located at the midpoint of a lure body.

Referring to FIGS. 3-5, the present invention uniquely permits rivet 12 to be positioned at various and different locations along lure body 20. Referring to FIG. 3, rivet 12 is located toward the leading end 24 of body 20. In FIG. 4, rivet 12 is located further away from leading end 24 of body 20, and in FIG. 5 rivet 12 is located in the middle of body 20. Changing the location of the point of connection between line 10 and body 20 uniquely changes the movement and operation of body 20 as it is cast into water, settles into the water, and is moved or otherwise retrieved. In one embodiment of the intention such as illustrated in FIG. 1, body 20 can be slightly buoyant so that it floats on the water surface after being cast. In other embodiments of the invention, the density of body 20 can be varied or adjusted to be neutrally buoyant or to be heavier than the water. The invention provides flexibility for top water presentation or for subsurface presentation that will suspend the lure at different levels within the water.

As shown in FIG. 4, second end 16 of rivet 12 can be located slightly below the exterior skin or surface of lure body 20 or can be located to extend above body 20 as shown in FIG. 5. By locating second end 16 of rivet 12 on top of body 20 instead of at the leading end 24 of body 20, the tendency of body 20 to rotate and turn upside down is minimized, keeping lure body 20 in the desired orientation relative to the water surface and bottom.

In conventional jig applications hook 18 is often inserted through body leading end 24 and the barb 26 of hook 18 is then buried slightly below the surface of body 20 to prevent barb 24 from hanging up on weeds, sticks or other underwater obstructions. By permitting attachment of rivet 12 at any location along the length of body 20, barb 26 can be "skin hooked" at different locations along the length of body 20 as shown in FIG. 5.

By providing a detachable point of connection between rivet 12 and hook 18, multiple and varied hook sizes, shapes and combinations can be installed, removed, or exchanged without modifying the connection between line 10 and rivet 12. Single hooks, treble hooks, and uniquely shaped hooks can be substituted in the field to adjust to the species and size of the target fish.

Figure 6:
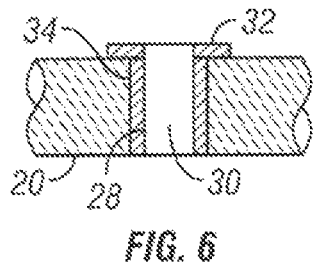
FIG. 6 illustrates a sectional view for one embodiment of a rivet having a cylindrical shape.

The shape and dimensions of rivet 12 can be modified to accomplish different objections. In one embodiment of the invention as shown in FIG. 6, rivet 28 comprises a substantially cylindrical or tubular structure having aperture 30 extending therethrough. In another embodiment of the invention, rivet cap 32 can be attached to rivet second end 34 for contacting body 20 and for limiting the depth of insertion of rivet 28 into body 10.

Although rivet 28 is shown as a generally cylindrical or tubular structure, rivet 28 can have many different shapes and configurations suitable to accomplish the function of piercing body 20 in a selected location and of restraining body 20 against sliding, bunching, stretching, or other permanent movement relative to line 10. Aperture 30 can also have many different shapes and sizes suitable for permitting insertion of line 10 or a retainer pin or linkage.

Figure 7:
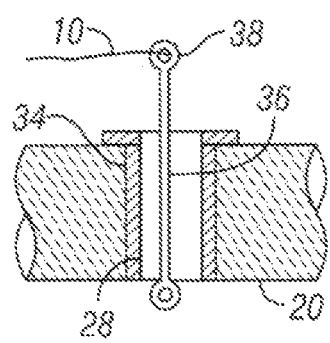
FIG. 7 illustrates a sectional view for a retainer inserted through a rivet aperture.

In another embodiment of the invention illustrated in FIG. 7, retainer 36 can be inserted through rivet aperture 28 to provide a point of connection to line 10 proximate the second end 34 of rivet 28. In other embodiments of the invention, retainer 36 can extend outwardly from rivet 12 as shown in FIG. 7 and include eye 38 for attachment to line 10.

Figure 8:
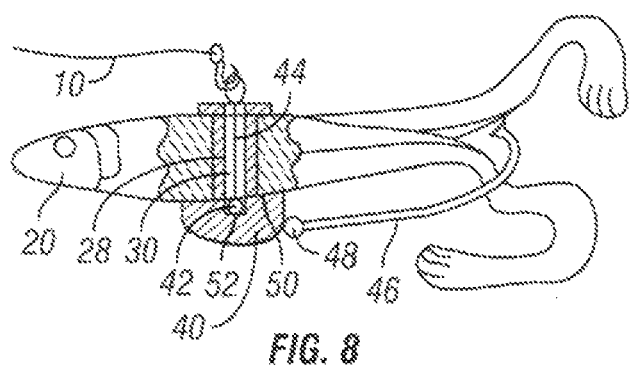
FIG. 8 illustrates a partial sectional view of a jig weight having a lower eye for connection to a retainer, a planar surface, and a transverse channel for shielding the lower eye.

FIG. 8 illustrates another embodiment of the invention wherein jig weight 40 includes lower eye 42. Line 10 can be inserted through aperture 30 of rivet 28 and attached to lower eye 42 to provide the retainer function similar to that described above. Alternatively, as illustrated in FIG. 8, retainer 44 can be detachably connected to lower eye 42 and then installed through aperture 30 to permit connection to line 10 at a position above and outside of body 20. Hook 46 can be integrated within jig weight 40 or detachably connected to hook eye 48 to facilitate installation and replacement of different hook shapes and combinations.

In one embodiment of the invention jig weight 40 can have planar surface 50 for contacting lure body 20. Planar surface 50 provides a base for increasing the contact with body 20 and further reduces the possibility of damage to base 20. Transverse channel 52 can be moulded into planar surface 50 to lower the profile of weight eye 48 in its point of connection with retainer 44. By shielding such connection from base 20, inadvertent contact and possible damage to base 20 is minimized during operation of the jig.

Figure 10:
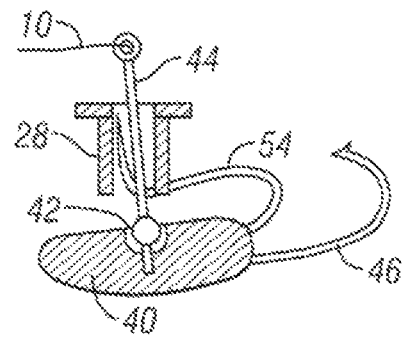
FIGS. 10 and 11 illustrate partial sectional views of a wire engaged with rivet for securing a bait body.
Figure 11:
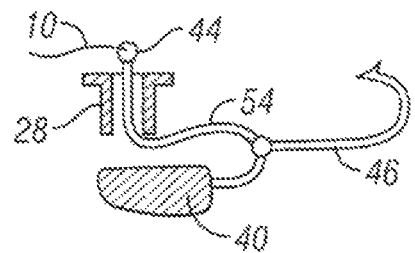
Figure 9:
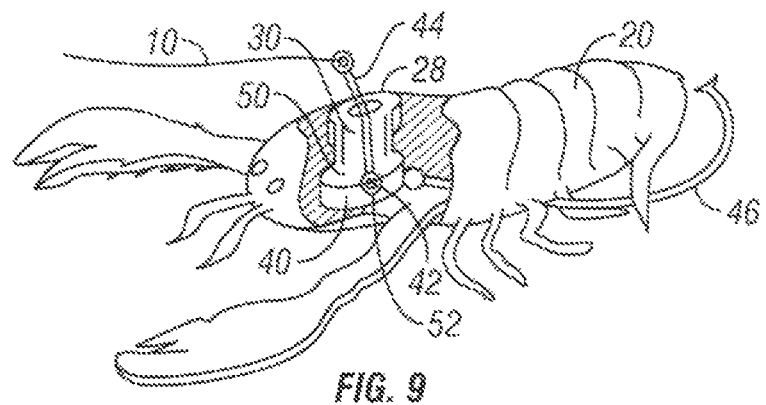
FIG. 9 illustrates partial sectional view of a rivet engaged with a weight located interior of the lure body.

FIG. 9 illustrates another significant feature of the invention, wherein rivet 28 partially extends into body 20. Depending on the configuration and shape of body 20, this embodiment of the invention permits a weight such as jig weight 40 to be positioned within the interior of body 20 to further disguise its presence, and to minimize the possibility of jig weight 40 snagging an underwater obstruction. As shown in FIG. 10, wire 54 attached to weight 40 can be threaded through body 20 and then attached to rivet 28 or to line 10. Hook 46 can be attached to weight 40 as shown, can be attached to retainer 44, or can be attached to wire 54 as shown in FIG. 11.

Figure 12:
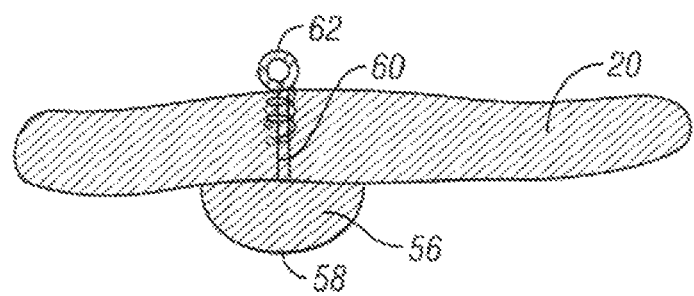
FIG. 12 illustrates a sectional view of combined rivet and retainer shown as a twisted wire rivet and eye.
Figure 13:
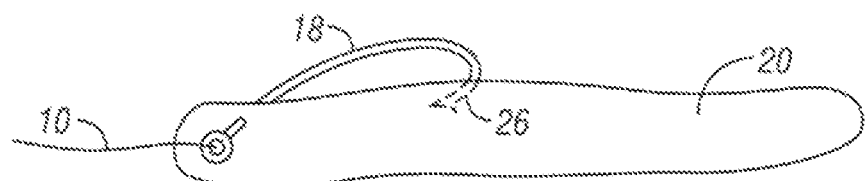
FIG. 13 illustrates the preliminary steps of hooking a barb and rivet through a soft body.
Figure 14:
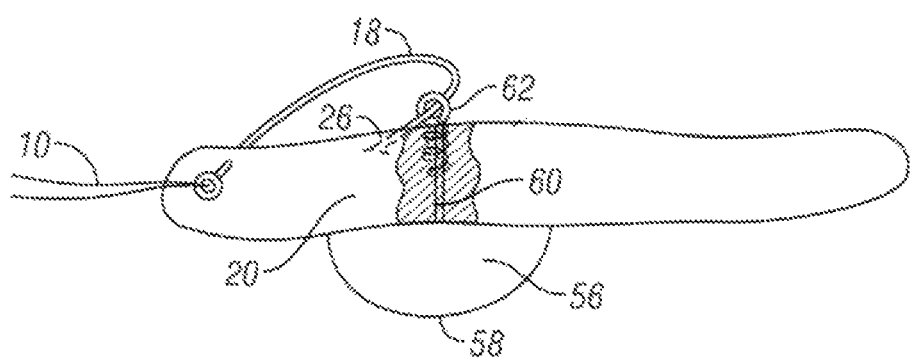
FIG. 14 illustrates a partial sectional view of preferred combination of hook barb and rivet, and particularly shows how the barb can be lightly inserted into the lure body.
Figure 15:
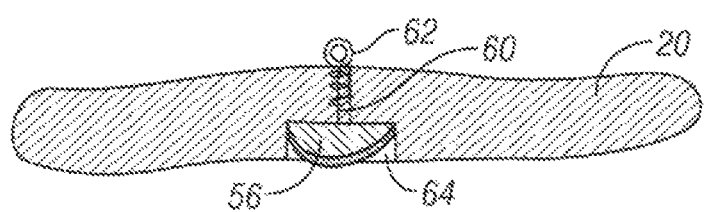
FIG. 15 illustrates an indentation or cavity in a lure body for engagement with a weight and attached rivet.

FIG. 12 illustrates another embodiment wherein rivet and retainer are integrated into a single, common element. As shown, weight 56 having rounded surface 58 is attached to rivet 60 comprised of a single wire looped to form eye 62 and wrapped or twisted around itself to prevent eye 62 from unravelling. Rivet 60 can be inserted into lure body 20 until eye 62 extends completely through or just barely below the exterior surface of lure body 20. In another embodiment, eye 62 is sufficiently large to permit the insertion of hook 18 barb 26 therethrough. As illustrated in FIG. 13, barb 26 is inserted completely through lure body 20 and hook 18 is rotated so that barb 26 is proximate lure body 20. As illustrated in FIG. 14, twisted wire rivet 60 is inserted into lure body 20 until eye 62 is proximate barb 26, and barb 26 is then inserted completely or partially through eye 62 after the hook 18 is passed completely through the lure body 20. In one application, barb 26 can be lightly hooked into lure soft body 20 to provide a lure profile resistant to snags as the lure body is deployed into or through water, for example, as clearly shown in FIG. 14, the plane of the hook 18 may be maintained in a selected orientation with reference to the lure body 20 by such penetration of the lure body 20 and the eye 62. To disengage hook 18 from rivet 60, hook 18 can be manipulated to back barb 26 out of eye 62, rivet 60 can be withdrawn from lure body 20 and can be redeployed at another position within lure body 20 (and reengaged with barb 26) to change the functional operation of lure body 20 in the water. Alternatively, rivet 60 and attached weight 56 can be exchanged with another weight and rivet having a different mass, configuration, shape, or functionality. This feature permits field experimentation to identify a combination of weight mass, hookup, and orientation adaptable to constantly changing fishing conditions. This feature also permits deployment and redeployment of the rivet and weight into and out of a lure body multiple times with minimal damage to the flexible lure body FIG. 15 shows indentation, depression or cavity 64 formed in lure body 20 for engagement with weight 56. By locating weight 56 in cavity 64 a smooth exterior lure profile is presented for movement through the water, weight 56 is concealed within lure body 20, and the combined lure profile presents fewer features which tend to snag or hang up on underwater obstructions. Cavity 64 can be formed during initial manufacture of body 20 or can be added later while rigging lure body 20. Twisted wire rivet 60 can be formed with dense materials to reduce the desired size of weight 56.

Although one surface of weight 56 is flat to rest against lure body 20, the rounded surface 58 of weight 56 reduces frictional drag through the water, thereby permitting the motion of lure body 20 to be primarily promoted by the shape of lure body 20, and also minimizes hang ups or snags by protecting the soft lure body from submerged obstructions, and by minimizing direct contact between the soft lure body and rocks or other submerged obstructions.

The invention provides unique techniques and methodologies for presenting fishing lures in the water. By adjusting the location of the rivet at different positions along the lure body, lure function can more closely mimic natural baits and different lure motions can be achieved to meet unique conditions of weather, water turbidity or clarity, underwater obstructions, and feeding habits of the target fish species. With the jig weight near the leading end of the lure body, dropping the lure will cause the lure to nose downwardly in the water. By moving rivet further away from the body leading end, the lure body will tend to spiral as it moves downwardly through the water. The width of the spiralling action can be adjusted by changing the location of the rivet along the lure body. By moving the rivet toward the middle of a lure body such as a worm, dropping the lure into the water will facilitate a more even descent of the lure body as it sinks. By moving the weight toward the rear of a lure body, other pushing type motions can be simulated.

Figure 16:
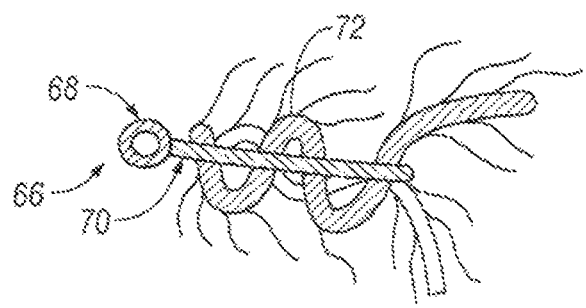
FIG. 16 illustrates a partial sectional view of a lure attachment having an eye attached to a shank for attachment to a leather strip or other peripheral attachment.

FIG. 16 shows another embodiment of the invention which significantly enhances modifications to the shape, sensory attributes, and movement of a lure body through water. Lure attachment 66 includes eye 68 and attached shank 70 for attachment to peripheral device such as leather strip 72. Leather strip 72 can be fastened to shank 70 with fishing line or other technique and provides an absorbant material for absorbing a fishing scent attractant and then for selectively releasing such scent attractant when the lure is deployed in water. Leather strip 72 can comprise a single strip or can be formed in multiple shapes and sizes. Although 72 is shown as a leather strip having attached hairs such component can be formed with many different materials and in many different compositions and shapes. Lure attachment 66 can be formed with different materials in different shapes and configurations to modify the shape of an artificial lure, to modify the sensory attributes of such artificial lure, and to modify the movement of such lure as it settles or is moved within water.

Figure 17:
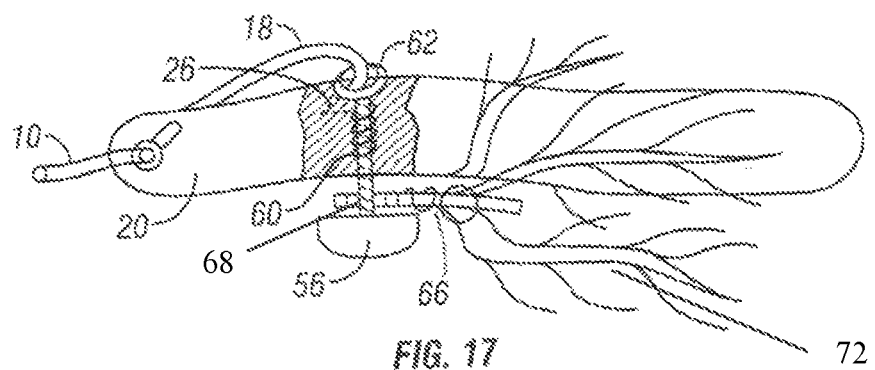
FIG. 17 illustrates one configuration for connecting a lure attachment to a rivet and lure body.

FIG. 17 shows another embodiment of the invention wherein lure attachment 66 is engaged with lure body 20. Wire rivet 60 is inserted through eye 68 of lure attachment 66 and is then inserted through lure body 20. Barb 26 is inserted through lure body 20 and then manuevered through eye 62 to retain rivet 60, attached weight 56, and lure attachment 66 in combination with lure body 20. To change lure attachment 66 for another having a different shape, orientation, sensory attributes, or material, barb 26 can be withdrawn from eye 68, rivet 60 can be removed from lure body 20 and lure attachment 66 can be removed for substitution and reinstallation of another lure attachment. Because of the minimum invasiveness of rivet 60 through lure body 20, rivet 60 can be reinserted within lure body 20 (in the same location as before or in another location along lure body 20) and fastened with barb 26 relative to lure body 20 as demonstrated before. In another embodiment of the invention more than one lure attachment 66 can be engaged with rivet 60 and lure body 20, and the location of lure attachment 66 can be oriented in other manners such as between barb 26 or hook 18 instead of being proximate to weight 56.

Figure 18:
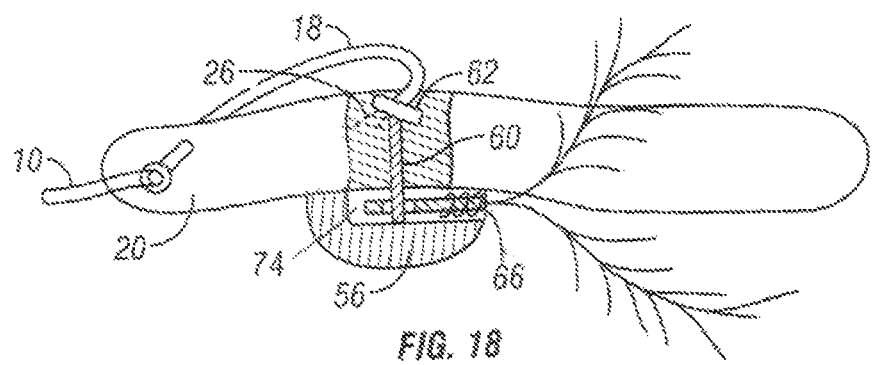
FIG. 18 illustrates a partial sectional view of a depression in a weight for concealing the lure attachment relative to a lure body.

In one embodiment of the invention lure attachment 66 can be loosely place between weight 56 and lure body 20 and pivotal and other movement therebetween can be freely encouraged as shown in FIG. 17. In other embodiments the relation of lure attachment 66 to weight 56 and lure body 20 can be varied such as in compressing lure attachment 56 therebetween to inhibit relative movement therebetween. In another embodiment of the invention shown in FIG. 18 the surface of weight 56 can be hollowed or shaped to permit the placement of lure attachment eye 68 and shank 70 between weight 56 and lure body 20 to minimize friction and other contact which might degrade or damage soft lure body 20.

The lure attachment illustrated in combination with a rivet and retainer provides significant flexibility and speed in rigging a soft or flexible lure body to a fishing line. The detachable and reattachable nature of the combination provides experimentation in the field to adapt to local weather and fishing conditions. Such flexibility permits adaptation with the same components without requiring a different arrangement of components and multiple tackle boxes full of varying rigs to adapt to the differing field conditions. In addition to the leather or other scent absorbant material illustrated in FIGS. 16 and 17, many different types of skirts, spoons, and other materials of different texture, shape, movement characteristics, and other variables can comprise the lure attachment in combination with the rivet and retainer.

Numerous variations and embodiments of the invention are possible, however each will extend the useful life of soft body lures and will uniquely affect the action of the lure body presentation in the water, thus allowing the user numerous new options for the bait presentation. In another embodiment of the invention illustrated in FIG. 18, lure attachment 66 can be positioned within depression 74 within weight 56 to minimize contact between lure attachment 66 and relatively soft or flexible body 20, therefor minimizing contact therebetween which might abrade or damage lure body 20. Different components can be quickly interchanged in the field under adverse conditions, and to adjust to current fishing conditions. The present invention provides a sliding ninety degree hook placement which is very versatile in rigging and more closely mimics a natural bait movement through the water. The invention permits a true weedless rigging to be deployed and permits various lure bodies to be deployed by pulling from the front, back, or middle, while providing a fluttery horizontal descent when released to settle in the water. The unique rigging permits the lure body to move over rocks and bottom debris without hanging up on the obstacles, and positions the hook in a configuration more likely to increase the fish hook-up percentage. The invention is sizable to virtually any size hook or lure configuration.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. A fishing lure, comprising:
   a lure body;
   a jig weight contacting one side of the lure body;
   a rivet having first and second ends, wherein said rivet first end is inserted into the lure body at a selected location, said rivet passing through said lure body from said one side and through a second side of said lure body such that said first rivet end is exposed, said rivet first end engaged with a fishing hook, said jig weight coupled to said rivet second end;
   a lure attachment engaged with said rivet between said lure body and said jig weight;
   a peripheral device coupled to said lure attachment; and
   wherein said fishing hook passes completely through said lure body and then through said first rivet end such that a plane of said fishing hook is maintained in a substantially fixed orientation with reference to said lure body.

2. A fishing lure as recited in claim 1, wherein said lure attachment includes an eye and a body connected to said eye.

3. A fishing lure as recited in claim 1, wherein said is detachably connected to said rivet for permitting engagement and disengagement of said lure attachment relative to said rivet and the lure body.

4. A fishing lure as recited in claim 1, wherein said jig weight has a rounded surface distal from contact between said jig weight and the lure body.

5. The fishing lure of claim 1 wherein said peripheral device comprises a leather strap.

* * * * *